Figure 1:
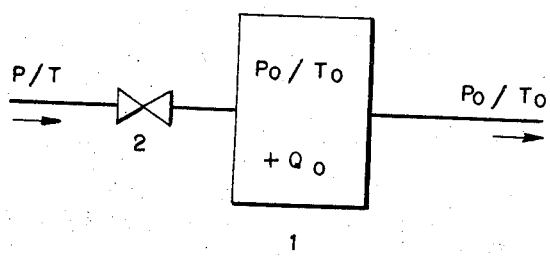

Oct. 31, 1967     K. WISSEROTH ETAL     3,350,376
METHOD OF CARRYING OUT POLYMERIZATION PROCESSES
Filed March 25, 1963

INVENTORS:
KARL WISSEROTH
WALTER PIETSCH
ERNST-GUENTHER KASTNING
BY
ATT'YS

United States Patent Office 3,350,376
Patented Oct. 31, 1967

3,350,376
METHOD OF CARRYING OUT POLYMER-
IZATION PROCESSES
Karl Wisseroth, Ludwigshafen (Rhine), Walter Pietsch, Lampertheim, and Ernst-Guenther Kastning, Assenheim, Pfalz, Germany, assignors to Badische Anilin- & Soda-Fabrik Aktiengesellschaft, Ludwigshafen am Rhein, Germany
Filed Mar. 25, 1963, Ser. No. 271,545
Claims priority, application Germany, Feb. 8, 1956,
B 39,038
16 Claims. (Cl. 260—93.7)

The present application is a continuation-in-part of application Ser. No. 638,635, filed February 6, 1957, and now abandoned.

This invention relates to improvements in the polymerization of monomers. More specifically, it relates to an improved method of continuously removing the heat evolved in polymerization processes without interfering with the mechanism of the polymerization.

It is known that the removal of polymerization heat in continuous polymerization processes offers considerable difficulty. If the monomers to be polymerized are in the liquid state, so-called boiling agents can often be used with advantage, i.e. liquid diluents or solvents which remove the heat of reaction by evaporation under the pressure and temperature conditions of the polymerization and are then condensed at a cooling surface and returned to the reaction mixture. This principle may also be used when gaseous materials are polymerized in the presence of solvents, provided polymerization is carried out at a moderate pressure at which the solvent may at the same time serve as the boiling agent. Basically, this method is also applicable in polymerizations at higher pressures, as for example at 20 atmospheres, but in this case it is usually necessary to use diluents having a relatively low boiling point, i.e. substances which are gaseous under normal pressure and at room temperature. Since normally liquid substances are generally required as solvents or dispersing agents for the polymerization catalysts, and these are liable to mix with the boiling agents, there is the further difficulty that the normal boiling behavior of the boiling agent is unfavorably influenced. In polymerization plant of the said type a rigid ratio of boiling agent to solvent for the catalyst must therefore be maintained at an increased constant pressure and this requires separate conveying means and in some cases also separating means for monomers, solvent and boiling agent.

We have now found that the difficulties heretofore encountred in polymerization processes can be obviated and the polymerization heat rapidly and efficiently removed by supplying one or a plurality of gaseous reactants under a pressure substantially higher than the pressure prevailing in the reaction zone, i.e. the reactor, and expanding the highly compressed reactants through a throttle valve into the reactor. The amount of gaseous reactant or reactants to be expanded into the reactor is 5 to 15 times, preferably about 6.2 to about 10.8 times, the amount of reactant being polymerized in the same period. As a result of the expansion the reactants are cooled (Joule-Thompson effect; adiabatic throttle effect) and are then capable of absorbing the reaction heat. One or more expanded reactants may become at least partly liquified by the attendant lowering of the temperature. The throttle valve may be fitted directly to the top of the reactor. In a preferred embodiment of our invention the throttle valve is fitted to the inlet for the gaseous reactants at a small distance from the reactor in order to thus prevent the narrow cross-sectional area of the throttle valve being in any way affected by the charge of the reactor. In this case the short section of the conduit between the throttle valve and the reactor should be well insulated to obviate any heat exchange with the ambient air and a consequent lessening of the cooling effect in the reactor.

Another embodiment of our invention consists in expanding into a reactor, through a throttle valve, a highly compressed gas or gas mixture, the components of which do not participate in or adversely affect the polymerization in the reactor. In this case the gaseous polymerization reactants may be fed to the reactor at the pressure prevailing in the reaction zone.

A further embodiment of our invention consists in expanding polymerizable and/or non-polymerizable reactants into the reactor through a throttle valve (Joule Thompson effect) and recompressing the said reactants or part thereof, after leaving the reactor, with conventional compressor means according to the compression-refrigerator principle, i.e. conveying the said reactants through the throttle valve into the reactor, thence to a compressor and back again to the throttle valve at a pressure which is substantially higher than the pressure prevailing in the reactor. Between the said compressor and the said throttle valve one or more heat-exchangers should be arranged. When the polymerizable reactants are recycled as described makeup can be continuously added for any quantity of reactants used up during polymerization in the reactor by using appropriate conveying means, for example a pump or a gravity vessel.

The process in accordance with our invention can be efficiently used for the known low-pressure polymerization of ethylene or propylene in the presence of catalysts which consist, for example, of mixtures of alkyl compounds of metals of groups I-A, II-A and III-A with compounds of metals of groups IV-B, V-B and VI-B of the periodic system of elements. Low pressure polymerization is carried out in a pressure range from 1 to 100 atmospheres.

Figure 2:
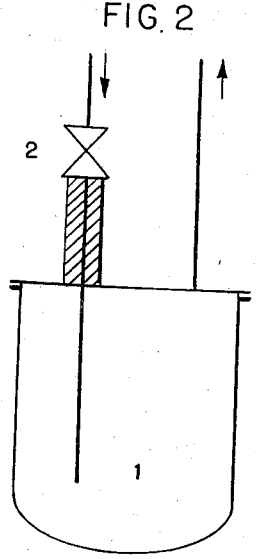
Figure 3:
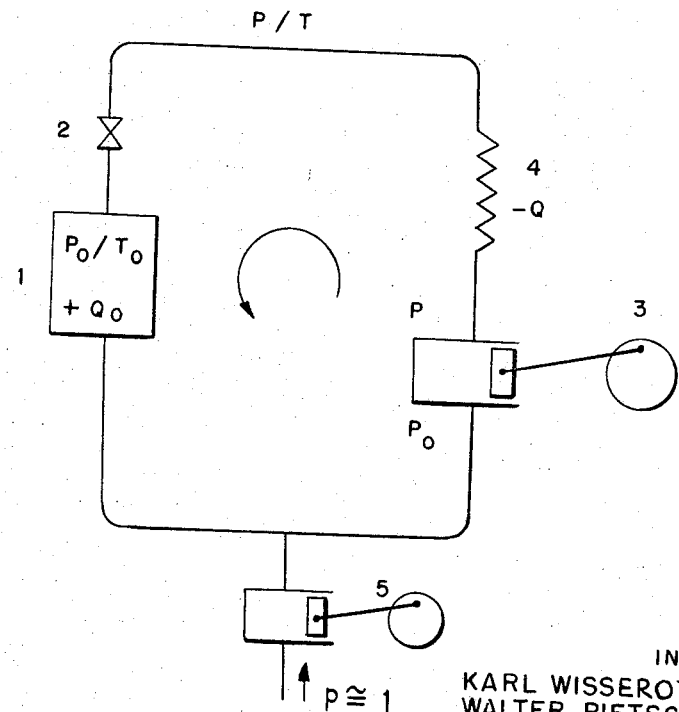

The basic concept of our invention will be better understood from the following description taken in connection with the accompanying diagrammatic drawing in which
FIG. 1 shows a throttle valve 2 and a reactor 1 with relative pressure and temperature data for the two elements;
FIG. 2 shows a reactor 1 and a throttle valve 2 with insulated inlet section between the reactor and the throttle valve;
FIG. 3 shows the reactor 1 and the throttle valve 2 as part of a circulation system where the reactants are compressed at a certain point by compressor means 3 and expanded into the reactor 1 through the throttle valve 2. The quantity of gaseous reactants used up in the reactor during polymerization is made up through conveyor means 5 arranged outside the system. Between the compressor means 3 and the throttle valve 2 a heat exchanger 4 is arranged.

An amount of monomer 5 to 15 times in excess of that required for the polymerization, if desired together with a nonpolymerizable gaseous reactant, is expanded into a reactor 1 through a throttle valve 2 from a pressure P to a pressure $P_0$ with the monomer being cooled and partly liquified. The excess amount of gaseous reactant, i.e., the amount leaving the reactor, may be calculated according to the formula:

$$\frac{\text{Total amount of gas per unit time}}{\text{Amount of gas polymerized per unit time}} - 1$$

By evaporation and reheating to temperature $T_0$, an amount of heat $Q_0$ is withdrawn from the reactor. The heated monomer which is now gaseous again is compressed adiabatically in a compressor 3 from pressure $P_0$ to pressure P, the gas becoming further heated. In one or more heat exchangers 4 arranged after compressor 3, an amount of heat Q is withdrawn so that the gaseous monomer assumes a temperature T which is essentially determined by the temperature of the coolant in the heat exchanger or exchangers. Makeup monomer is added through a conveyor pump 5 or from a feed tank under pressure as used up by the polymerization in the reactor.

The process in accordance with our invention lends itself to removing the heat of reaction in the polymerization of normally gaseous monomers, as for example, ethylene, propylene, isobutylene, vinyl chloride or fluorinated ethylenes. Our invention is particularly adapted to effectively controlling the discharge of heat in the low pressure polymerization of ethylene and propylene, so that very high space-time yields are achieved.

The following examples will further illustrate this invention but the invention is not restricted to these examples.

*Example 1*

25 kilograms of a solution of 5 grams of titanium tetrachloride in pentane and 25 kilograms of a suspension of 5 grams of n-amyl sodium in pentane are separately run into a reactor in continuous flow per hour. At the same time 60 kilograms of ethylene are continuously decompressed per hour through a throttle into the reaction mixture from 150 atmospheres, at room temperature, to the reaction pressure of 10 atmospheres. The ethylene which is thus cooled down to a low temperature absorbs the reaction heat to an extent that a reaction temperature of 20° C. with tolerances of ±3° C. is set up. At about ten minutes interval charges of 9 to 10 kilograms of a polymer suspension are withdrawn from the reactor which contain about 800 to 900 grams of a polyethylene having a molecular weight of 1,600,000. The unreacted ethylene which escapes from the reactor is again compressed to 150 atmospheres for re-use, and the solvent entrained by the ethylene in accordance with its vapor pressure is stripped in a separator after compression.

*Example 2*

25 kilograms of a solution of 5 grams of titanium tetrachloride in pentane and 25 kilograms of a solution of 20 grams of aluminum triethyl in pentane are separately run into a reactor in continuous flow per hour. At the same time 48 kilograms of ethylene are decompressed per hour through a throttle into the reaction mixture from a pressure of 150 atmospheres, at a temperature of minus 15° C. to the reaction pressure of 30 atmospheres. As a result, the reaction temperature is set to about 10° C., the output being about 800 to 900 grams of polyethylene per ten minutes which is obtained in the form of a 10% polymer suspension. The polymer has a molecular weight of 150,000.

When using a 40 l. reactor in Examples 1 and 2, the space-time yield is about 125 grams of polymer for each liter of reactor volume per hour in both cases.

*Example 3*

25 kilograms of a solution of 5 grams of titanium tetrachloride in pentane and 25 kilograms of a suspension of 5 grams of n-amyl sodium in pentane are separately run per hour into a reactor in continuous flow. At the same time 60 kilograms per hour of ethylene compressed to 150 atmospheres is continuously expanded through a throttle valve into the reaction mixture at room temperature to the reaction pressure of 10 atmospheres. The ethylene which is thus cooled down to a low temperature absorbs the reaction heat to such an extent that a reaction temperature of 20° C. with tolerances of ±3° C. is obtained. About 5 kilograms of polyethylene having a molecular weight of 1,600,000 is withdrawn from the reactor as a 10% polymer suspension. The excess ethylene added for cooling purposes is eleven times the amount polymerized during the same period. The unreacted ethylene leaving the reactor is recompressed to 150 atmospheres for further use, and the solvent entrained by the ethylene according to its vapor pressure is stripped in a separator after compression.

*Example 4*

25 kilograms of a solution of 5 grams of titanium tetrachloride in pentane and 25 kilograms of a solution of 20 grams of aluminum triethyl in pentane are separately run per hour into a reactor in continuous flow. At the same time 48 kilograms per hour of ethylene compressed to 150 atmospheres is expanded through a throttle valve into the reaction mixture at a temperature of minus 15° C. to the reaction pressure of 30 atmospheres. As a result, a reaction temperature of about 10° C. is set up, the output being about 5 kilograms of polyethylene per hour in the form of a 10% polymer suspension. The polymer has a molecular weight of 150,000. The excess ethylene added for cooling purposes is 8.6 times the amount polymerized in the same period.

*Example 5*

45 kilograms of cyclohexane and 5 kilograms of a suspension of 100 grams of a chromic acid impregnated silica/alumina catalyst in cyclohexane are separately run per hour into a 150 l. reactor in continuous flow. To maintain a reaction temperature of 135° C. 36 kilograms per hour of ethylene at room temperature is continuously expanded through a throttle valve into the reaction mixture from 150 atmospheres to the reaction pressure of 35 atmospheres. The product continuously obtained per hour is about 10% polymer solution from which about 5 kilograms of a polyethylene with the molecular weight 80,000 is stripped after expansion. The excess ethylene added for cooling purposes is 6.2 times the amount polymerized in the same period. The spacetime yield is about 33 grams of polymer for each liter of reactor volume per hour.

*Example 6*

3 grams of titanium trichloride and 2 grams of aluminum triethyl are supplied per hour separately to a polymerization reactor. At the same time, 43 kilograms per hour of propylene compressed to 100 atmospheres is continuously expanded through a throttle valve into the reaction mixture at approximately 100° C. to the reaction pressure of 25 atmospheres, the propylene thus being cooled. By vaporization of the partly liquefied propylene and absorption of heat the heat of polymerization is removed and the reaction temperature maintained at 100° C. Approximately 5 kilograms of pulverulent polypropylene of molecular weight 900,000 is removed per hour. The excess propylene added for cooling purposes is 7.6 times the amount polymerized in the same period.

We claim:

1. In a continuous process for polymerizing a monomeric gaseous reactant at a pressure up to 100 atmospheres, the improvement which comprises controlling the temperature within the reaction zone by introducing into said reaction zone an amount of gaseous reactant 5 to 15 times in excess of that required for the polymerization with a Joule-Thompson throttled expansion from a pressure substantially higher than the pressure within said reaction zone such that the Joule-Thompson cooling effect of the throttled gaseous reactant is sufficient to neutralize the excess exothermic heat of polymerization, withdrawing the excess unpolymerized gaseous reactant from the reaction zone, recompressing said withdrawn and unpolymerized gaseous reactant to a pressure substantially higher than the pressure within the reaction zone, cooling the recompressed gaseous reactant and recycling said reactant for said throttled expansion into said reaction zone, a sufficient quantity of fresh gaseous reactant being added to the excess unpolymerized gaseous reactant to maintain a continuous process.

2. A method as in claim 1 wherein the gaseous reactant is a member of the group consisting of ethylene, propylene, isobutylene, vinyl chloride and fluorinated ethylene.

3. A method as in claim 2 wherein said gaseous reactant is at least partially liquefied by the Joule-Thompson cooling effect.

4. A method as in claim 3 wherein the gaseous reactant is ethylene.

5. In a continuous process for polymerizing a monomeric gaseous reactant, the improvement which comprises controlling the temperature within the reaction zone by introducing a nonpolymerizable gaseous component into the reaction zone along with said gaseous reactant, said nonpolymerizable gaseous component being introduced into the reaction zone with a Joule-Thompson throttled expansion from a pressure substantially higher than the reaction pressure such that the Joule-Thompson cooling effect of the throttled nonpolymerizable gaseous component is sufficient to neutralize the excess exothermic heat of polymerization, withdrawing said nonpolymerizable gaseous reactant from the reaction zone, recompressing said nonpolymerizable gaseous component to a pressure substantially higher than the pressure within the reaction zone, cooling the recompressed nonpolymerizable gaseous component and recycling said component for said throttled expansion into said reaction zone.

6. A method as in claim 5 wherein the gaseous reactant is ethylene.

7. A method as in claim 5 wherein said nonpolymerizable gaseous component is at least partially liquefied by the Joule-Thompson cooling effect.

8. A method as in claim 1 wherein the gaseous reactant is ethylene.

9. A method as in claim 1 wherein the gaseous reactant is propylene.

10. In a continuous process for polymerizing a monomeric gaseous reactant, the improvement which comprises controlling the temperature within the reaction zone by introducing an excess of said gaseous reactant into said reaction zone with a Joule-Thompson throttled expansion from a pressure substantially higher than the pressure within said reaction zone such that the Joule-Thompson cooling effect of the throttled gaseous reactant is sufficient to neutralize the excess exothermic heat of polymerization, withdrawing the excess unpolymerized gaseous reactant from the reaction zone, recompressing said withdrawn and unpolymerized gaseous reactant to a pressure substantially higher than the pressure within the reaction zone, cooling the recompressed gaseous reactant and recycling said reactant for said throttled expansion into said reaction zone, a sufficient quantity of fresh gaseous reactant being added to the excess unpolymerized gaseous reactant to maintain a continuous process.

11. A method as in claim 1 wherein the amount of gaseous reactant is from 6.2 to 10.8 times that required for the polymerization.

12. A process as in claim 11 wherein the gaseous reactant is ethylene.

13. A process as in claim 11 wherein the gaseous reactant is propylene.

14. A process as in claim 10 wherein the gaseous reactant is ethylene.

15. A process as in claim 10 wherein the gaseous reactant is propylene.

16. A process as in claim 10 wherein said gaseous reactant is at least partially liquefied.

References Cited
UNITED STATES PATENTS

| | | | |
|---|---|---|---|
| 710,957 | 10/1902 | Dyer | 62—86 |
| 2,484,384 | 10/1949 | Levine | 260—93.7 |
| 2,825,721 | 3/1958 | Hogan et al. | 260—94.9 |
| 2,846,426 | 8/1958 | Larson | 260—94.9 |
| 2,906,742 | 9/1959 | Thomka et al. | 260—94.9 |

JOSEPH L. SCHOFER, *Primary Examiner.*

J. F. McNALLY, J. A. DONAHUE, *Assistant Examiners.*